United States Patent
Checcucci et al.

(10) Patent No.: US 9,225,692 B2
(45) Date of Patent: Dec. 29, 2015

(54) METHOD AND SYSTEM FOR PROTECTED TRANSMISSION OF FILES

(75) Inventors: Alessandro Checcucci, Siena (IT); Davide Tazzari, Arezzo (IT); Filippo Vernia, La Spezia (IT)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 14/238,345

(22) PCT Filed: Aug. 12, 2011

(86) PCT No.: PCT/IT2011/000298
§ 371 (c)(1),
(2), (4) Date: Aug. 11, 2014

(87) PCT Pub. No.: WO2013/024497
PCT Pub. Date: Feb. 21, 2013

(65) Prior Publication Data
US 2014/0351584 A1    Nov. 27, 2014

(51) Int. Cl.
G06F 21/00    (2013.01)
H04L 29/06    (2006.01)
G06F 21/10    (2013.01)
G06F 9/445    (2006.01)
G06F 21/60    (2013.01)
H04L 29/08    (2006.01)

(52) U.S. Cl.
CPC .............. *H04L 63/0428* (2013.01); *G06F 8/61* (2013.01); *G06F 21/105* (2013.01); *G06F 21/606* (2013.01); *H04L 67/06* (2013.01)

(58) Field of Classification Search
CPC ........................... G06F 21/6209; G06F 21/105
See application file for complete search history.

(56) References Cited

U.S. PATENT DOCUMENTS

| 6,073,172 A | 6/2000 | Frailong et al. |
| 6,996,819 B1 * | 2/2006 | Alanis ........................... 717/173 |
| 7,305,561 B2 | 12/2007 | Hunt et al. |

(Continued)

FOREIGN PATENT DOCUMENTS

| EP | 1273996 | 1/2003 |
| WO | 2004070538 | 8/2004 |

OTHER PUBLICATIONS

European Patent Office: PCT International Preliminary Report on Patentability, dated Nov. 14, 2013.

(Continued)

*Primary Examiner* — Morshed Mehedi
(74) *Attorney, Agent, or Firm* — Patterson Intellectual Property Law, P.C.; Mark J. Patterson; Gary L. Montle (57) ABSTRACT

To protect a software to be transferred to programmable electronic devices, a management system for programmable electronic devices is provided, comprising: a plurality of electronic devices (57), each identified by at least one unique identification parameter (ID) and containing at least one encryption key (Key); —at least one protected site (41) in which a protected database (45) resides, in which the unique identification parameter (ID) and the encryption key (Key) are stored for each electronic device (57); —a server (49) programmed to receive a request for transmission of a software from a device (57) and to generate an encrypted version of said software, using the encryption key (Key) associated in the database (45) with the unique identification parameter (ID) of the device (57) that has requested the transmission of said software.

14 Claims, 4 Drawing Sheets

(56) References Cited

U.S. PATENT DOCUMENTS

| | | |
|---|---|---|
| 2002/0026634 A1 | 2/2002 | Shaw |
| 2002/0194492 A1* | 12/2002 | Choi et al. .................... 713/200 |
| 2003/0056107 A1* | 3/2003 | Cammack et al. ............ 713/189 |
| 2003/0217358 A1 | 11/2003 | Thurston et al. |
| 2003/0220983 A1 | 11/2003 | Hui |
| 2005/0144612 A1 | 6/2005 | Wang et al. |
| 2005/0166198 A1 | 7/2005 | Gigliotti et al. |
| 2005/0216909 A1* | 9/2005 | James et al. .................. 717/174 |
| 2005/0229171 A1 | 10/2005 | Henry et al. |
| 2005/0278716 A1* | 12/2005 | Koppen et al. ................ 717/168 |
| 2006/0075077 A1* | 4/2006 | Brookner ....................... 709/220 |
| 2006/0106806 A1 | 5/2006 | Sperling et al. |
| 2008/0046878 A1 | 2/2008 | Anderson |
| 2008/0165952 A1* | 7/2008 | Smith et al. .................... 380/28 |
| 2009/0202069 A1* | 8/2009 | Cox et al. ........................ 380/44 |
| 2010/0122076 A1* | 5/2010 | Witty ................................ 713/2 |
| 2011/0029783 A1* | 2/2011 | Thorsen ................. G06F 21/73 |
| | | 713/189 |
| 2011/0138377 A1* | 6/2011 | Allen ............................ 717/173 |
| 2012/0137137 A1* | 5/2012 | Brickell ................ H04L 9/0816 |
| | | 713/182 |

OTHER PUBLICATIONS

Office Action dated Apr. 22, 2014 issued by the USPTO in U.S. Appl. No. 13/724,232 (now abandoned).

* cited by examiner

METHOD AND SYSTEM FOR PROTECTED TRANSMISSION OF FILES

TECHNICAL FIELD

The present invention concerns a method and a system for managing the transmission of protected software, for example for programming and/or updating remote devices.

BACKGROUND ART

The current technology allows programming and updating of software resident on remote electric and electronic devices. The application software and operating systems of ordinary household computers, PCs and laptops, are also constantly and periodically updated, either on the request of the user or automatically. Similarly it is common practice to update via the Internet firmware for the management of a wide range of electronic devices such as CD and DVD players, PlayStations, Internet connection routers, etc. This offers the users obvious advantages.

The possibility of updating remote devices is also an advantage for the manufacturers of the devices, for example they can distribute the devices equipped with software or firmware in a reduced version and enter the market in a much quicker timeframe than the one normally required to develop and test complete software. The end user can then acquire, free of charge or by payment, the updated and most advanced versions of the software or firmware. The end user can also be certain that the product acquired is maintained and that any future software problems can be tackled and solved. Furthermore, the manufacturer will have the advantage that it can correct software and/or firmware defects which are inevitably present in the first versions marketed.

The development of technology and connectivity between electronic equipment, processors, network servers etc. has considerably widened the possibility of connecting any device to a system, for example a company server, to download new or updated software. On-line updating is available in an increasing number of situations, both free of charge and by payment, for example in the form of an annual subscription. Operating systems for personal computers, antivirus programs and application software for computers are some of the commonest examples.

In the industrial and production sector, situations can occur in which a company requires an external supply to compensate for internal deficiencies or limits, for example a limited production capacity or simply an organization policy whereby some parts or equipment are produced by outside companies. In all these cases there is a need to exchange confidential information (wiring diagrams, assembly plans, mechanical drawings, firmware etc.). Legal tools, such as NDA (Non-Disclosure Agreements) do not always provide adequate protection of the company's proprietary know-how. Furthermore, if production is outsourced to third parties, there is always the risk of an over-production intended for the parallel market with consequent economic losses, which can be considerable, for the company owning the know-how and the intellectual property.

Figure 1:
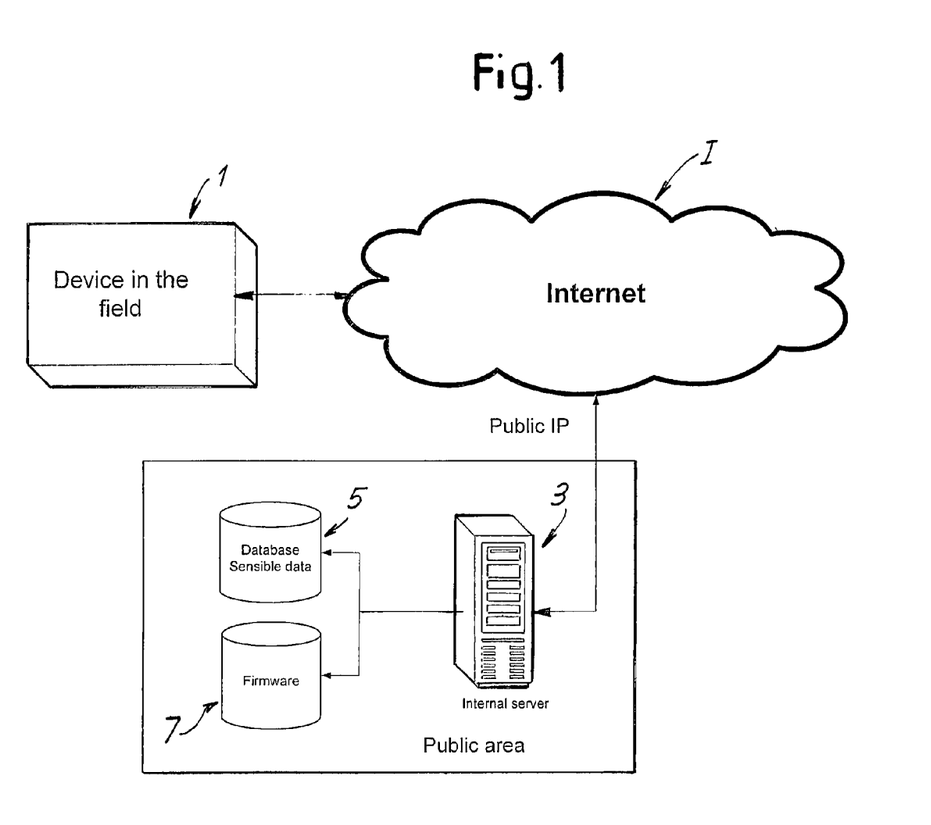
FIGS. 1 and 2, already described, show two diagrams of connection of a generic device to a server via the Internet.
Figure 2:
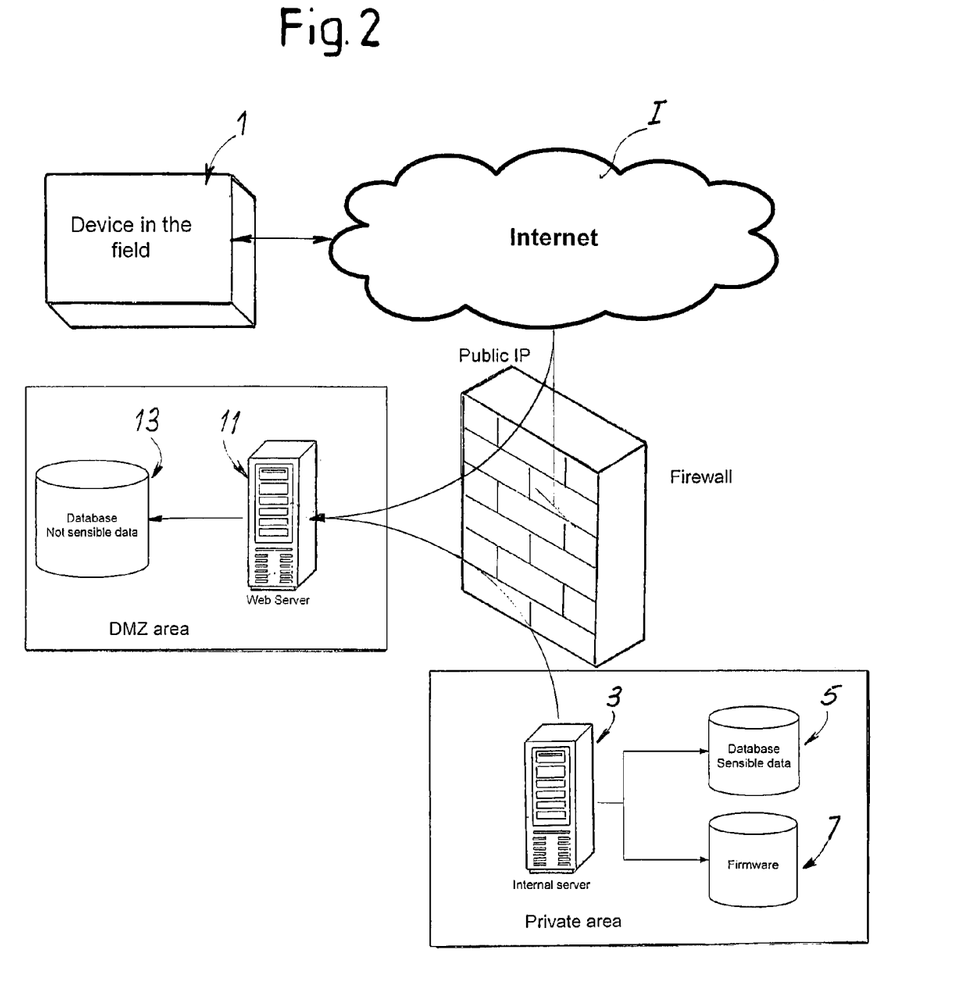

FIGS. 1 and 2 show schematically two possible connection systems of a remote device to a server of a manufacturing company, for example in order to program or update the files of said device.

More specifically, FIG. 1 shows a functional diagram of a system in which a generic device 1, for example an electronic device or electronic equipment, with software or firmware on board, connects via the Internet I to a company server 3 to autonomously download an update resident in the company server 3. The latter is connected to a database containing sensitive data indicated by 5 and to a firmware or software archive indicated by 7.

Instead of a direct connection of the device 1 to the server 3 via the Internet I, an indirect connection can be provided via a local computer, for example a PC or a laptop to which the device 1 is connected and which is in turn connected to the Internet I. In this case it is the local computer that establishes the connection and downloads the software or firmware in order to then update the device 1. In this case the computer can be physically connected (by means of wired or wireless connection or in another way) to the device to be updated, or the connection can be provided manually, i.e. the updated software/firmware can be downloaded via the computer from the Internet I and then passed to the device to be updated by means of a memory support, for example a flash memory, a DVD, a CD or other support.

A system devised as in FIG. 1 is without protection and an attack on the company server 3 would endanger the sensitive data.

To avoid this circumstance, an architecture of the type schematically illustrated in FIG. 2 is usually provided: the device 1 connects to a public server (web server) 11 which has access to a database containing non-sensitive data, indicated generically by 13. The company server, again indicated by 3, is connected to the database 5 containing the sensitive data and to the software or firmware archive 7, which must be protected from the outside. This protection is provided by a firewall 15 which prevents direct access to the company server 3 by an external device, whether it is a generic device in the field which requires an update or downloading of software/firmware or whether it is a computer in turn connected or connectable to the device to be updated.

In this way the device or the external user has access only to the area indicated as DMZ (in jargon DeMilitarized Zone) via which he can access, for example, a series of company services, but he cannot access in an uncontrolled manner the area containing the sensitive data, the software/firmware and in general the know-how of the company that owns the server.

Other techniques exist for the protection of sensitive data in a situation in which an external user can request access, via the Internet or another non-protected connection, to a company server, for example NAT (Network Address Translation) technology.

To protect the information content of firmware or software in transit through a non-protected channel, for example via the Internet or by e-mail, the firmware or software is encrypted to make it unrecognizable to a third party. Currently there are a large number of encryption techniques of various types. All the encryption techniques are based on the use of at least one encoding or encrypting key, called master key, or a plurality of said keys, which remain secret and typically possess the parts which, within an information management system, are responsible for encrypting and decrypting the software or firmware. The encryption algorithm is based on the intrinsic difficulty of recovering the original information (the program code before encryption) starting from the encrypted information without knowing the encryption key or keys.

In the case of devices in the field to be updated, the encryption key or keys must reside in the bootloader, i.e. in the program responsible for starting the functions of the device every time said device is switched on. This is necessary since the bootloader is the only program able to update the device and therefore requires knowledge of the encryption key or keys to decrypt the updated software or firmware which is downloaded or in any case supplied to the device.

In traditional systems there are various vulnerable points which can constitute security holes in the transmission systems of encrypted codes or software/firmware:

the source codes, i.e. the non-encrypted software or firmware, are available also to non-authorized persons and in any case the person who writes the code knows the encryption keys. Unscrupulous personnel could steal this information and use it for themselves or pass it on to non-authorized subjects;

the bootloader in executable format (binary code) is necessarily written in plain text because otherwise it would not be functional for the microcontroller that has to use it. This non-encrypted code is also available outside the company that owns the software to be protected, for example it can be supplied to third-party companies to whom production of the devices is outsourced, or it can be present in non-secure production sites, for example delocalized with respect to the headquarters of the know-how owner company;

the binary code of the decrypting program necessary for integrally reprogramming the device with the code in plain text. Normally this information is possessed only by the know-how owner company and is intended for internal use only. Supply of this information to technicians for intervention in the field, for example at the premises of a client, would expose the company to the risk of loss of confidential information.

To reduce the risk arising from the third factor listed above, software exists which provides a conversion application program that is difficult to decrypt. The other two sources of risk cannot currently be effectively neutralized.

In short, in the scenario briefly outlined above, multiple problems can occur, including:

guaranteeing that the device to be updated is a device authorized to obtain the update, for example a device for which the update fee has been duly paid, or that it is an original device of the manufacturer which makes its software updates available;

guaranteeing correct correspondence between the software/firmware downloaded and the device on which it is installed;

preventing interception of transmission of an updating software or firmware by a non-authorized third party, which could make fraudulent use of it;

preventing a non-authorized update from being installed on a device;

allowing the end user efficient updating of his software/firmware, at the same time protecting the manufacturer's confidential information;

guaranteeing that a third party manufacturer, to whom the production of certain articles has been outsourced, produces the number and type of articles permitted and not others;

tracking the products distributed for the purposes of maintenance or servicing in general.

SUMMARY OF THE INVENTION

The invention proposes a new method and a new system that allow at least some of the problems summarily referred to above, concerning to security in the management of know-how and in particular in the transfer of software and accessory data, to be wholly or partly overcome. By software any code, in source form, or executable form, including the firmware, the operating systems, the application software etc is meant By accessory data any type of data vital for the application, such as tables, images, configuration parameters, sound files, etc. are meant.

In the following description and in the attached claims, software and/or firmware is defined as a generic program, also called code, consisting of a sequence of instructions which is intended to be run, directly or appropriately compiled, interpreted or translated, by a microcontroller, in addition to any accessory data, as defined above, if envisaged. The terms software and firmware, although used alternatively or in combination, both define a program or part of a program, which can consist of or form part of a bootloader, an operating system, a generic application software or other. By microcontroller an electronic circuit is generically meant, capable of running a program. By production site a place is generically meant, used for one or more of the following operations: manufacturing, programming, assembly, maintenance, reconversion, up-grading, reconditioning or any other hardware or software operation on a generic piece of equipment containing at least one electronic part. By know-how owner company a physical or juridical subject is meant, which owns confidential information, in particular in the form of software or firmware.

Substantially according to one embodiment, to wholly or partly solve the problems of security connected with the transfer of proprietary software of a company to one or more devices, the invention provides a system for the management of programmable electronic devices, comprising:

a plurality of electronic devices, each identified by at least one unique identification parameter and containing at least one encryption key;

at least one protected site in which a protected database resides, in which for each electronic device the respective unique identification parameter and the respective encryption key are stored;

a programmed server: to receive from one of said devices a request to transmit a software; and to generate an encrypted version of said software, using the encryption key associated in said database with the unique identification parameter of the device that has requested said software transmission.

The unique identification parameter can be attributed to the device in the production phase or in the initial programming phase. For example the unique identification parameter can be given by one or more data inserted in the chip of the microcontroller on board the device and programmed by the chip manufacturer, or the unique identification parameter can be inserted by the company owning the know-how to be protected.

Analogously, the encryption key can be stored by the manufacturer of the microcontroller installed in the device or can be attributed by the company owning the software or know-how to be protected.

As will appear clear from the detailed description of embodiments of the invention, with a system of this type it is possible to program and/or update various devices protecting the software, which is transferred from the protected area or site to the device in encrypted version by means of an encryption key which is not transferred together with the software and which in general is never transmitted from one point to another of the system. It is impossible for an ill-intentioned person to appropriate the encryption key and this makes it substantially impossible to decrypt and therefore illegally use the software.

In advantageous embodiments the server is programmed to store information concerning the transmissions of software to the devices, and to subordinate the transmission of a software requested by one of said devices to at least one condition defined by said information. For example, the server can be programmed to prevent a second transmission of a software to a device to which said software has already been sent once. For said purpose, for each transmission of software, it is sufficient for information to be stored that allows the server to know which device (identified by its unique identification parameter) has received which software or which software version. This makes the use of cloned devices impossible. In fact, if two cloned devices exist, therefore characterized by the same unique identification parameter, only one of them can be updated.

In some embodiments the system can comprise one or more production sites, different from the protected site and if necessary also positioned at a distance from the latter. In the production site or in each production site the devices are manufactured and/or assembled and/or programmed. The production site or each production site may not be under the control of the company owning the know-how to be protected. In the production site or in each one of them, a programmer can be provided to receive a software from the server of the protected site and program the devices with the software transferred from the protected site.

In some embodiments, a program generator is provided in the protected site to generate a software associated with the unique identification parameter of the respective programmable device that requests the software installation. The program generator also combines with the software an encryption key corresponding to said unique identification parameter of the device that has requested the software or for which the software is intended. The software is encrypted with said encryption key and sent to the device identified by the unique identification parameter.

The server can be appropriately programmed to: receive a request for a software by one of said devices, said request comprising at least the unique identification parameter of the requesting device; check if the unique identification parameter of the device that has requested the software is contained in the protected database; if the unique identification parameter of the requesting device is contained in the protected database, check whether the requesting device satisfies at least one update enable condition; if said condition is satisfied, send to the requesting device a version of the software requested, encrypted with the encryption key associated with the unique identification parameter of the requesting device. The request can be sent automatically or by an operator. The request can be forwarded for example via a non-protected channel, via the Internet or in another way. In some embodiments the request can be run manually, for example by an operator who physically receives or downloads onto a memory support the software and then deals with programming. The update enable condition can be correlated, for example, with the existence of a maintenance or updating contract, or the existence of a guarantee contract. In some embodiments the device can receive the requested software only if the server recognizes said device as being enabled. In some embodiments the update enable condition can be correlated with previous update requests. For example, the enable condition can be satisfied when the requesting device has not previously requested the same update and not satisfied if the requesting device has already previously requested the same update. In more complex cases, the update enable condition may be satisfied when the requesting device has previously performed all the updates prior to the one requested. In general an update enable condition correlated with previous update requests can reduce or avoid the possibility of updating illegally cloned devices.

In some embodiments, the server in the protected area is programmed to supply, to each of said devices, a bootloader, and in particular a bootloader associated with an encryption key and/or with a unique identification parameter of the device, or both.

According to a different embodiment, the invention concerns a method for installing a software on a plurality of electronic devices, comprising the steps of:
  associating with each electronic device at least one unique identification parameter and at least one encryption key;
  storing, in a protected database, the respective unique identification parameter and respective encryption key for each device;
  encrypting a software to be installed on one of said devices with the encryption key of said device;
  transferring said encrypted software to said device;
  installing the software in said device.

In some embodiments the method can comprise the steps of:
  generating a software request by one of said devices, said request comprising at least the unique identification parameter of the requesting device;
  checking that the unique identification parameter of the device requesting said software is contained in said protected database;
  if the unique identification parameter of the requesting device is contained in the protected database, checking at least one condition concerning previous update requests by the requesting device;
  if said condition is satisfied, sending to said requesting device a version of the software requested, encrypted with the encryption key associated with the unique identification parameter of the requesting device.

The method can also comprise the step of verifying whether, for the unique identification parameter of the requesting device, the software to be installed has already been transferred. If not, the method can provide for transfer of the software to said device. If not, transfer of the software to said device can be denied and/or a signal can be generated.

If the unique identification parameters are supplied by the microprocessor manufacturer, it can be stated that the particular product on the market with negative verification outcome has not been produced by an authorized company and/or has not been authorized in another way.

BRIEF DESCRIPTION OF THE DRAWINGS

The invention will be better understood by following the description and the accompanying drawings, which show practical non-limiting embodiments of the invention. More specifically, in the drawing.

DETAILED DISCLOSURE OF EMBODIMENTS

Some characteristics of the architecture of any microcontroller form the precondition for the invention. Typically a microcontroller can be programmed with additional codes (called "fuse bits") in which a memory area is established that cannot be read by external instruments (programmers/debuggers) and cannot be deleted. This is the area where the bootloader, i.e. the first program that is launched at reset of the microcontroller, typically resides. This is done to avoid the bootloader being damaged, deleted or corrupted, for example as a result of an external intervention. Since it resides in a non-accessible and non-deletable area, the possibility of accidental, involuntary or fraudulent damage of the bootloader is eliminated.

There are two ways of accessing the bootloader code: write a fraudulent code, which allows a backup of the bootloader to be made, or connect up to a programming device (for example JTAG) and try to make the backup. In the first case the bootloader will refuse to run it because it is not valid, as it is not encrypted with the expected parameters (which are unknown). In the second case the microcontroller will prevent access, since it is protected, and the only possible alternative will be to delete the entire contents of the microcontroller code area, effectively deleting also the information one wishes to recover, thus making recovery impossible.

A part of the protected area is reserved for storing in plain text one or more encryption keys of the software or firmware required by the device, for example an application program. Only the bootloader can access this part of the protected area during execution of the code or program to read the encryption key(s) to be used to decrypt any application code (software/firmware), which it must run or anything else necessary for a correct operation of the device or the program.

Figure 3:
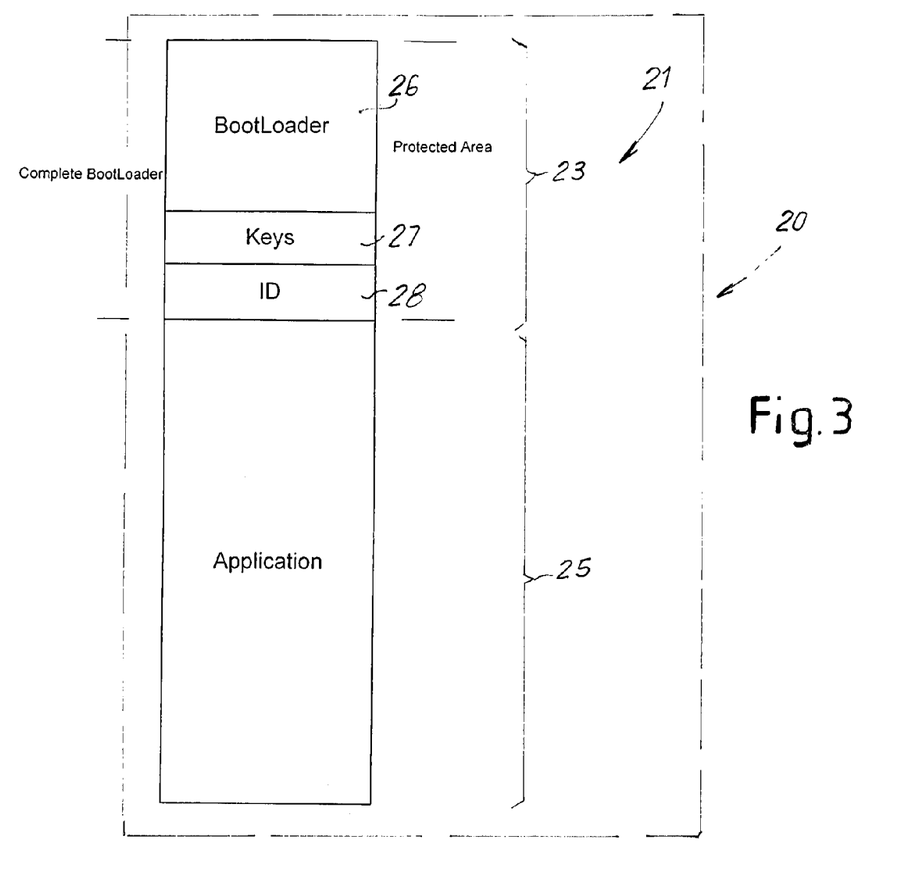
FIG. 3 shows a diagram of a memory part of a device for the storage of a bootloader.

Another portion of the protected area is used to store one or more unique identification parameters of the device. FIG. 3 shows schematically a memory 21 of a generic microcontroller 20 forming part of an electronic device. The memory is divided into a protected area 23 and a non-protected area 25. In the second one, as mentioned, one or more application programs reside. Vice versa, in the protected area 23 there are three zones dedicated to storage of the bootloader (zone 26), the encryption key(s) (zone 27) and the unique identification parameter(s) of the device (zone 28).

In general one or more encryption keys and one or more unique identification parameters of the device can be used. Below, for the sake of simplicity, reference will always be made to an encryption key and a unique identification parameter of the device, it being understood that both can in reality be multiple, i.e. a device can have more than one encryption key and/or more than one unique identification parameter also in combination with each other.

By encryption key any key is meant, which can be used to encrypt and decrypt a software or firmware by means of an encryption and/or decryption algorithm. By unique identification parameter any parameter is meant, which allows unique identification of a given device. A unique identification parameter can consist, for example, of a string of binary digits. In general each device manufactured by the company that owns the know-how to be protected will be marked or identified by a unique identification parameter different from all the other devices.

As will become clear from the following description, the encryption key and the unique identification parameter of a generic device are controlled according to the invention in an innovative manner, in order to increase protection of the know-how of the know-how owner company, increasing sensitive data protection safety, including in particular the application programs, and in general the software/firmware developed by the company.

The memory zones 26, 27 and 28 of the generic microcontroller 20 are defined by the programmer who writes the bootloader, who will reserve at linker level the three zones 26, 27 and 28, defining their addresses. The programmer will then store the bootloader in zone 26, while the encryption keys and unique identification parameters can be entered in zones 27 and 28 of each microcontroller at a later stage. In this way the programmer does not know the contents of zones 27 and 28. He will create the bootloader leaving zones 27 and 28 empty or filled with dummy characters, which have no meaning and will be subsequently modified. In other embodiments the bootloader, encryption key and unique identification parameter can be inserted in one single operation, in certain protected conditions, as described below. In further embodiments the microcontroller can be integrally pre-programmed, with the bootloader, the encryption key and the unique identification parameter, by the microcontroller manufacturing company, different from the company that owns the know-how to be protected. In further embodiments, the microcontroller manufacturer can program the encryption key and the unique identification parameter, leaving free the memory space for the bootloader, which will be programmed by the company that owns the know-how to be protected or with the consent and under the control of the latter.

Updating of one or more software or firmware resident in the non-protected area 25 requires knowledge of the encryption key and unique identification parameter of the device. In this way, by protecting these data (encryption keys and unique identification parameters of the device and their combination), fraudulent use of the bootloader or other software or firmware, for example updating software or firmware, is impossible since it is impossible to decrypt them.

The invention is based on the idea of protecting the encryption keys and the unique identification parameters of the devices, so that they are not possessed by persons outside the know-how owner company and, by extension, even unknown to the latter in the case of automated generation and writing of these parameters.

The use of encryption keys and unique identification parameters of the devices also allows, as will become clear below, control of the single devices, avoiding an overproduction for sale on parallel markets, updating of non-authorized devices, verification that the correct updated software is installed on the correct device or even the creation of ad hoc software versions for particular devices.

If the microcontroller is programmed by the microcontroller manufacturer, as occurs in some recent solutions, the protected areas of the microcontroller memory are filled with random codes, which can be considered or treated like encryption keys. In other architectures, so-called OTP (One Time Programmable) areas are provided which are programmed during production of the microcontroller with unique codes that are not intercorrelated. Some chips contain unique data for tracing production: chip number, position in the silicon wafer, week of production and other; these data can also be used for this purpose. In general these areas will be treated like the protected areas 27 and 28 of the diagram of FIG. 3, i.e. they contain information which is recovered when the bootloader is run, or to decrypt a new software or firmware, and are not used during programming of the bootloader or any other firmware stored in the microcontroller memory.

In general, the bootloader does not contain the encryption keys. If it is stolen, the encryption algorithm can be traced back via reverse engineering. However, this information is still not sufficient to decrypt any encrypted software or firmware, since the encryption key or keys are missing. As mentioned, the latter do not reside in the bootloader; they reside in the protected area 27 or 28 of the microcontroller memory from which, for the reasons indicated above, they cannot be recovered.

To avoid the risks connected with appropriation of the encryption key and unique identification parameters, a bootloader that contains these additional data is generated automatically, via a program dedicated to this function. This program, defined below as program generator, must know the following:
- the number of overall parameters to be entered (encryption keys and unique identification parameters of the device for which the bootloader is intended);
- the position in the file (i.e. in the bootloading program) of each individual parameter (encryption keys and unique identification parameters);
- permitted minimum and maximum dimension of each parameter;
- the criterion for filling the empty spaces if the identification parameters and the encryption keys do not completely fill the memory spaces for these parameters;
- the procedure for creating a valid file and validation codes of the parameters entered and of the complete code with the respective parameters and encryption keys, so that the bootloader generated by the program generator can be run by the microcontroller in the boot phase.

Figure 4:
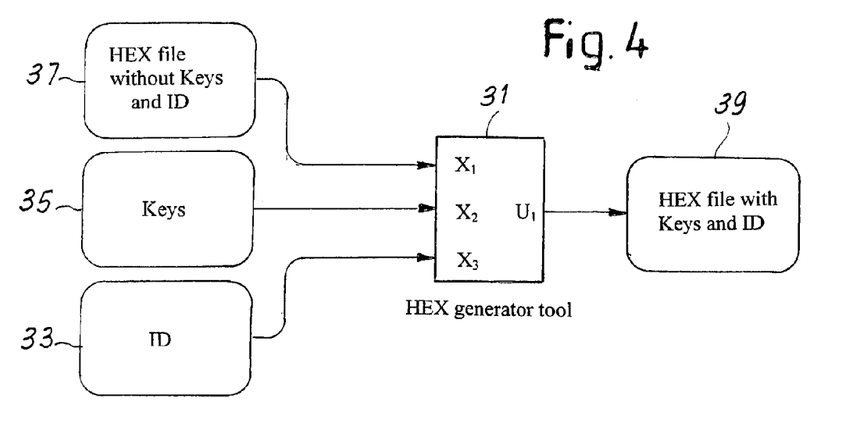
FIG. 4 shows a functional block diagram of an encrypted software or encrypted firmware generator starting from a code without encryption keys and identification code.

FIG. 4 shows a functional diagram of the program generator, represented by block 31. It receives in input the unique identification parameter (ID, block 33) of the device for which the bootloader generated is intended, the encryption key (Keys, block 35) and the bootloader (block 37) without encryption key and unique identification parameter. At the output of the program generator 31 the bootloader is obtained (block 39) containing the encryption key (Keys) and the unique identification parameter (ID) of the device for which the bootloader is intended.

The bootloader complete with encryption key and unique identification parameter (block 39) is loaded in the microcontroller intended for the corresponding device.

This operation can be avoided if the microcontroller is pre-programmed, i.e. already provided with encryption keys and identification parameters stored in the protected zones 27 and 28 (FIG. 3) of the microcontroller.

This microcontroller programming phase can be carried out, for example, at a third party company that produces, on behalf of the company owning the know-how to be protected, the electronic devices on whose microcontroller the bootloader must be stored. The know-how owner company, which supplies the bootloader and the application software or firmware, enables the third party company, which can be located on a different production site and distant from the headquarters of the know-how owner company, to program the microcontrollers while maintaining control of the software (bootloader) and protection of the respective intellectual property, also avoiding the overproduction of devices intended for the parallel market, with the procedure described below.

Protection of the sensitive data, consisting firstly of the encryption key or encryption keys and the identification parameter(s), is achieved as follows.

For all devices to be produced or programmed, a request is generated by the manufacturing company for an encryption key. The company owning the know-how to be protected creates an encryption key "Key" for each device and a unique identification parameter ID for every request, i.e. for every device to be produced or programmed, and generates a database which contains at least the information concerning the encryption keys, combined with respective unique identification parameters ID of the respective devices. The data are stored in a combined manner: each unique identification parameter of a device is combined with the respective encryption key associated with said device.

In some embodiments the database that collects this information contains for example a record for each device for which production or programming by the third party production company is authorized or requested. Each record contains the encryption key relative to that device and the unique identification parameter of that device. The record therefore provides a combination of encryption key and unique identification parameter of the device. Each device will have in general an encryption key different from the other devices, but this is not essential. The important thing is that each device can be uniquely identified and distinguished from the others, by means of the respective unique identification parameter.

This database must reside in an adequately protected area of the IT system of the know-how owner company. Access to the database is obtained during creation of a code (bootloader or a different software or firmware, for example an application program) to be installed on a given device.

If the microcontrollers of the devices are already programmed by the microcontroller manufacturer with the corresponding encryption keys and identification parameters, the microcontroller manufacturer shall supply to the company owning the know-how to be protected the information consisting of the keys and identification parameters combined with each other, so that the know-how owner company can store this information in its protected database.

Having said this, there are two possible methods for managing the information to program a new device in safety conditions:
- in the first case the program generator that generates the software (for example the bootloader) to be installed on the device is located in a protected area, for example in the protected site of the company owning the know-how to be protected. This situation is schematized in the diagram of FIG. 5;
- in the second case the program generator that generates the software to be installed in the device is located in the production site, i.e. in a non-protected area, for example at the works of a third party company that produces/programs the devices on behalf of the know-how owner company. This situation is schematized in the diagram of FIG. 6.

Figure 5:
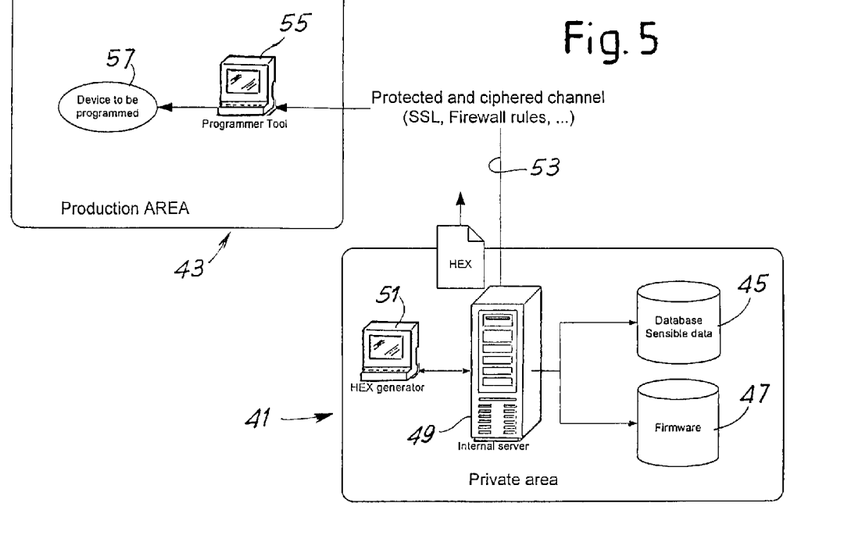
FIGS. 5 and 6 show two functional block diagrams of two different configurations of a communication system between an internal server associated with a generator of encrypted software and a device in the field.

In the diagram of FIG. 5, the reference number 41 indicates a protected area in which the data of the know-how owner company reside. Reference number 43 indicates a generic non-protected area, for example the site where the devices are produced or programmed. In the protected area 41 the archives with the database containing the sensitive data are arranged, comprising in particular the encryption keys and the unique identification parameters of the devices. This archive is indicated by the number 45. The block indicated by 47 represents the company software/firmware archive, including the bootloader(s) if necessary.

The archives 45, 47 can be accessed by an internal server 49, adequately protected towards the outside, with techniques of known type. The internal server 49 can comprise a program generator, or can be interfaced with a program generator, schematically represented by block 51 and called "HEX Generator" in FIG. 5. The separation into functional blocks 51 and 49 is purely an indication, it being understood that the program generator "HEX Generator" can be part of or reside in the server 49.

As mentioned, the program generator has the function of generating for example a bootloader comprising the encryption key and the unique identification parameter of the device on which the bootloader has to be loaded. In practice, the program generator 51 takes the software, for example a bootloader without encryption key and unique identification parameter, from the archive 47, in addition to the encryption key and the unique identification parameter of the device to be programmed from the archive 45. In some embodiments, the server 49 generates the encryption key and the unique identification parameter during the request for programming of a microcontroller of a device, on the one hand supplying these data to the program generator 51 and on the other storing them in the database 45.

The program generator HEX Generator 51 then generates a software or firmware, for example a bootloader, complete with encryption key and identification parameter. The program thus generated is sent, via any adequately protected channel, indicated schematically by 53, towards the non-protected area 43, for example a production site.

FIG. 5 schematically represents in the production site 43 a device 57 to be programmed. The number 55 indicates a programmer (Programmer Tool). The latter is a tool, known per se, that physically carries out programming of the device 57.

Transmission of the program containing the encryption key and the unique identification parameter can be in plain or encrypted text. In the latter case the encryption key cannot be the one attributed to the device 57 in the programming phase, since said key is not yet known in the production site. Encryption is therefore performed with an encryption key which is chosen by the programmer 55 and can be communicated via the protected channel 53 to the company server 49, together with data representative of the credentials of the programmer 55, for example an identification code, which allows the server 49 to ascertain that the request generated comes from an authorized programmer. If several production sites and/or several programmers 55 are scheduled, each one can be characterized by its own identification code and therefore the server 49 is able to know (and store) for each encryption key and relative unique identification parameter the programmer from which the request was made. The encryption key associated with the programmer 55 may not be sent by the programmer to the server 49, but stored in a protected area in the site 41, for example in the database 45, for example combined with the respective programmer identification code.

In short, therefore: the request for a software, for example a bootloader, for a new device 57 to be programmed, is sent to the protected site 41 via the protected channel 53. When a request of this type is received by the server 49 located in the protected site 41, the server 49 will carry out the following operations:

generate at random at least one encryption key (Key) for the device 57 to be programmed. The key can be generated using any known technique;

generate at least one unique identification parameter (ID) for the device 57 to be programmed;

store a new record containing the encryption key combined with the unique identification parameter in the database 45;

take the bootloader from the archive 47. In general the archive 47 will contain several bootloaders, for example for different devices and/or different bootloader versions. Preferably, the most updated bootloader dedicated to the type of device 57 to be programmed will be taken;

use the program generator 51 to generate the complete file to be sent, consisting of the bootloader with the encryption key and the unique identification parameter of the device;

transmit on the safe channel 53 the program complete with encryption key and unique identification parameter attributed to the device 57 to be programmed.

The programmer 55 receives the bootloader from the safe channel 53 and loads it into the microcontroller of the device 57. At this point the device is programmed with a bootloader that contains an encryption key dedicated to the single device 57, identified by the respective unique identification parameter. If the bootloader with the encryption key and the unique identification parameter have been encrypted before the transmission, the programmer 55 is able to decrypt them, i.e. rewrite them in plain text before loading them in the protected memory of the microcontroller. Since the programmer 55 does not make any physical copy of the information received, unlawful appropriation of information is prevented also on the non-protected production site, where the information is in transit from the programmer 55 to the device 57.

Figure 6:
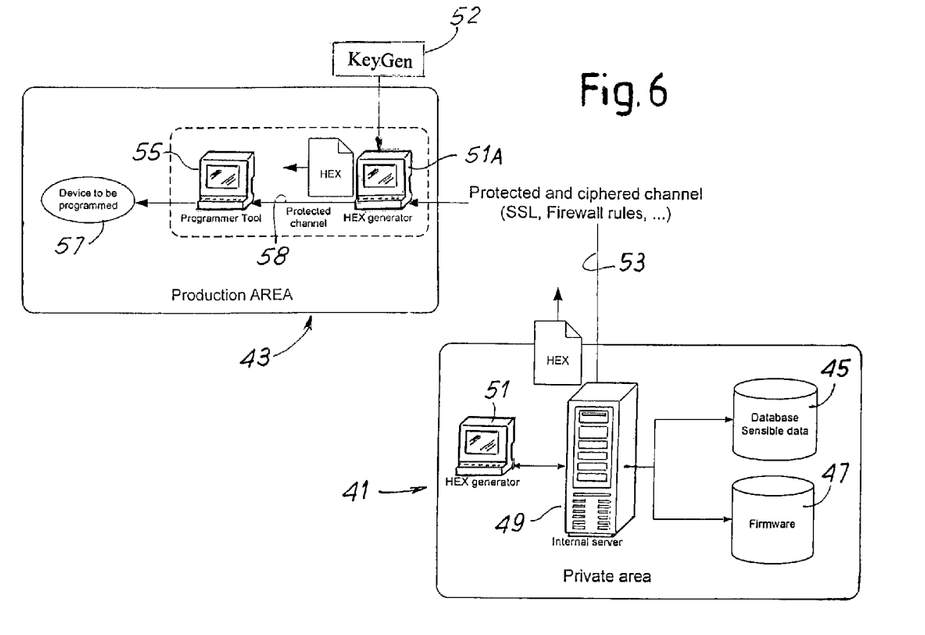

In the case schematically represented in FIG. 6, it is hypothesized that the program generator is positioned in the non-protected area, i.e. in the production site 43. In FIG. 6 equal numbers indicate parts equal or equivalent to those of FIG. 5. In this configuration, a program generator 51A is present in the non-protected area or site 43 and connected, by means of a protected channel 58, to the programmer 55. In some embodiments the two instruments (programmer 55 and program generator 51A) can be designed as one single component having the two functions, such that the protected communication channel 58 between the two instruments is not necessary anymore. The programming procedure is described below with reference to two separate devices 55 and 51A, but the procedure will be substantially the same even if the functions of these two devices are incorporated in one single instrument.

In the diagram of FIG. 6 a program generator 51 is provided also in the protected area 41, for the purposes that will be clarified later on.

When a new device 57 has to be programmed, the program generator 51A sends via the protected channel 53 a request to the server 49, providing its credentials, for example its identification number, known to the server 49. If necessary it can also transmit an encryption key, or the server 49 may know the encryption key associated with the program generator 51A.

The server 49 takes the most appropriate bootloader from the archive 47 and sends it through the protected channel 53. The bootloader, in which the encryption key associated with the device 57 to be programmed is missing, is at least partly completed by the server 49 before the transmission. In particular, the server 49 generates a unique identification parameter (ID) which is attributed to the device 57. As in the case previously described, the bootloader could be encrypted before transmission on the protected channel 53, for example by means of an encryption key associated with the respective program generator 51A or with the respective programmer 55.

The program generator 51A receives the bootloader and compiles it by inserting the encryption key in it. This encryption key must be known also to the server 49. In fact, as in the configuration described with reference to FIG. 5, also in this case the server 49 must store in the database 45 the combination between encryption key (Key) and unique identification parameter (ID) of each device 57 programmed. The purposes of this will be explained below. While the unique identification parameter is provided by the server 49, the encryption key is generated in the non-protected area 43 and therefore it must be made known somehow to the server 49, without passing through the channel 53.

For said purpose techniques known per se can be used for the generation of identical keys in the server 49 and in the program generator 51A. For example the program generator 51A can be associated with a generator of pseudo-random numbers. At any time it is possible for the server 49 to know what random number is generated by the random number generator of a given program generator 51A. If several program generators 51A are provided, for example in different production sites, each of them will be associated with its own generator of pseudo-random numbers, said generators of pseudo-random numbers being different from one another, i.e. such as to generate sequences of pseudo-random numbers different from one another.

Each generator of pseudo-random numbers is characterized by a "seed" (different for all the pseudo-random number generators) for generation of the pseudo-random numbers. In the diagram of FIG. 6, block 52 indicates a pseudo-random number generator of this type. When the program generator 51A has to program a new device 57, it requests the pseudo-random number generator 52 for one or more encryption keys. The encryption key will be given by one or by a sequence of said pseudo-random numbers. Furthermore, the program generator 51A will send to the server 49 the request to receive a bootloader, together with its credentials. For each program generator 51A, the server knows both the seed for generating the sequence of pseudo-random numbers and the identification code representing the credential of the program generator. When the server 49 receives a request, therefore, it is able to know what encryption key has been generated by the pseudo-random number generator 52 associated with the program generator 51A that has sent the request for transmission of a bootloader for programming a new device 57. The server 49 can therefore store in the database 45 the record containing the unique identification parameter of the device 57 to be programmed (which has been assigned by the same server 49) and the encryption key.

In short, therefore, also in this case the server 49 is able to store in the database 45 the combination of unique identification parameter (ID) of the device 57 and the relative encryption key (Key) for each manufactured and programmed device 57.

The programmer 55 (Programmer Tool) provided in both the embodiments of FIGS. 5 and 6 is in general a tool, which in the production phase is used to physically program the device 57 once the bootloader or in general the program file has been obtained from the server 49.

Since the device 57 must be programmed with the program in plain text, i.e. not encrypted, the programmer must:
  provide a safe connection with the program generator that provides the bootloader complete with encryption key and identification of the device to be programmed;
  possess an identification key (hardware or similar) which allows the know-how owner company to identify the programmer in a unique manner. Said key can be used as an encryption key for the exchange of information with the program generator (generator 51 in the case of FIG. 5; generator 51A in the case of FIG. 6);
  decrypt the file received to render it in plain text and allow programming of the device;
  not save in any format and on any support the software/firmware received and transformed into plain text;
  control the programmer according to the specifications of the manufacturer of the programmer and microcontroller to be programmed;
  prevent the programming of two devices with the same program after the first programming has been successfully performed.

These characteristics allow the know-how owner company to keep a trace of the different programmers 55, which can be provided in different non-protected areas 43 and of the devices 57 which are actually programmed.

If the program generator and the programmer are configured as one single tool, the functions described above shall be provided for said single tool.

If it is necessary to increase the production capacity by means of a new production site or a new manufacturer, all the know-how owner company has to do is to provide a new programmer 55 with its own unique identification key, for example a hardware key, and store this information in the protected archive, accessible by the server 49. If the presence of the program generator 51A is scheduled at the production site, this component will be provided, again with its own identification key or identification code.

The system described so far allows safe programming of the devices 57 with a bootloader provided by the know-how owner company, which has control of the server 49 and the databases associated with it.

In some cases the microcontroller can be programmed by the chip manufacturer not only with the encryption keys and if necessary with the unique identification parameter, but also with the bootloader. In this case the bootloader programming phase described so far is omitted and the company owning the know-how to be protected will receive from the manufacturer of the microcontrollers that will be installed on the devices 57 all the information to be stored in the database 45, or the records containing, for each microcontroller, the encryption key and the unique identification parameter. The bootloader could also be stored in the archive 47.

The bootloader which is loaded on the single devices 57 can generally be of two types:
  a completely closed bootloader: in this case it does not communicate in any way with the outside;
  an open bootloader with a communication route or channel that allows programming of the first program.

Programming of the application software/firmware and related updates on the produced devices 57 differs according to the type of bootloader used.

If the bootloader has a communication channel with the outside, once the bootloader has been loaded in the device 57, it can receive an application software/firmware and load it in the device via the bootloader communication channel. This can be any type of channel, for example an ethernet, serial, secure digital or wireless connection etc.

According to the type of channel available, the bootloader can download the application software/firmware directly, via an ethernet connection for example, and load it in the memory so that it can then run it. The device 57 connects directly and, via the bootloader, downloads the application software/firmware. In the case of a local channel (secure digital) an operator downloads the application software or firmware, puts it on a board and inserts the board in the housing of the device 57 so that the bootloader downloads the application software or firmware from the board.

In both cases, the first application program (software or firmware) can be supplied by means of a procedure similar to the one described with reference to FIGS. 5 and 6 for programming of the bootloader (if not provided directly by the microcontroller producer). When the device 57 has been provided with its own bootloader, which will also contain the unique identification parameter (ID) assigned to the device and the encryption key (Key) assigned to the device, transmission of the application program (software or firmware) to be loaded can be requested, via the channel 53. The procedure is the same as the one described to send and load the bootloader, the only difference being that at this point, since both the unique identification parameter and the identification key have already been attributed to the device 57, these data do not have to be provided by the server 49. Furthermore the combination of encryption key (Key) and unique identification parameter (ID) for the device in question are already stored in the database 45.

The request for a new application program is then received by the server 49, which:
retrieves the application program from the archive 47,
if necessary retrieves from the database 45 the encryption key associated with the unique identification parameter of the device 57 that sent the request;
if necessary encrypts the application program with said encryption key;
sends the application program (encrypted, if necessary) via channel 53 to programmer 55.

The encrypted application program is then loaded on the device 57. If it has been sent encrypted, here it will be decrypted by means of the encryption key which already resides in the device, since it has been loaded in said device following one of the previously described procedures. The decryption operation must be performed inside the device without involving external entities (e.g. memories) which can provide information on the process.

If the bootloader has no communication channel, a first application program will have to be provided during programming of the bootloader. In this case, therefore, the program generator 51 (FIG. 5) or 51A (FIG. 6) will generate a file which is the result of the sum, the concatenation or in general any combination between bootloader and initial application program, i.e. of two programs. The resulting file can be encrypted with the encryption key assigned to the programmer 55 or to the program generator 51A or can be not encrypted. This composite firmware will be programmed by the programmer 55 directly on the device 57. The bootloader and the application program (after decrypting if necessary) will be loaded in the memory of the microcontroller of the device 57. Since the bootloader and the first application program pass through the programmer 55 in plain text, as indicated above, the programmer 55 will not have to make a copy of the program, thus avoiding generating holes in the security system. The program in plain text (bootloader and application program) will never be in a condition such that they can be extracted and copied illegally.

At the end of the operation, the device 57 will be programmed with the bootloader, the encryption key (Key) and the unique identification parameter (ID), stored in the protected area 23 (FIG. 3) of the microcontroller and with an application program in plain text stored in the non-protected area 25.

Alternatively, together with the bootloader a "dummy" application program can be provided, i.e. a firmware that does not have any function other than allowing the device 57 to download a "real" application program. In this case the device is started and the "dummy" application program carries out the request to the server 49 for an updated application program using the ID of the device to be recognized. Once the device has been recognized, the server 49 safely carries out the procedure already described, encrypting the firmware with the encryption key Key associated with the unique identification parameter ID associated with the device 57 during the programming phase and which has already been stored in the microcontroller of the device 57, as well as in the protected database 45 of the site 41, where it is found combined with the unique identification parameter of the device 57.

If the microcontroller is supplied already programmed with the encryption key, the unique identification parameter and the bootloader by the microcontroller producer, the procedures for programming the application program are the same.

When the device 57 has been programmed with its own bootloader, its own encryption key, its own unique identification parameter and the application program, it can be installed in the field and can dialogue, via any non-protected channel, with a monitoring server or with the owner of the device, for example also with the server 49. The connection can be made directly or via a computer to which the device is connected. Via the data attributed to the device, and in particular the unique identification parameter, in the case of connection to a server it is possible for the company that manufactures the device and owns the know-how to verify, for example, if the device connected actually corresponds to one of the devices that have been produced, or if it is the result of a cloning or non-authorized overproduction. It is also possible to verify, for example, if it is a device under warranty, or for which maintenance or updating contracts etc. have been signed. All this allows the client who physically uses the device to benefit from a series of after-sale services.

In particular, it is possible to carry out updates of the software/firmware with which the device is provided, to correct defects in the initial software or firmware, to provide further functions requested by the client or simply to replace an obsolete application program with another more recent one.

The update can be performed manually, with the intervention of the operating personnel. Vice versa, the update can be performed in remote mode by the client who has purchased the device and who downloads an updated software or firmware via the Internet or e-mail or via any other type of connection. It is also possible for the update to be performed automatically, with the device 57 which is programmed to directly request the updating of its own software or firmware.

In each of these cases, the firmware or software has to come out of the protected area, represented schematically by the archive 47 in FIG. 5 or 6, and is transferred to the device 57, via a generally non-protected transmission channel, or physically on a memory support supplied to the technical support personnel in the field. This can constitute a hole in the security system.

According to the invention, the problem is solved as follows. The updating request, however it is made, arrives at the server of the know-how owner company, for example the server 49. In the case of on-line updating, this occurs via an internet request which can arrive in a non-protected and publicly accessible area, for example a public server like the server 11 illustrated in FIG. 2. From here, the request is passed by the public server 11 to the internal server (server 3 in FIG. 2, server 49 in FIGS. 5 and 6). The unique identification parameter (ID) of the device 57 that made the request is combined with the update request, or said parameter can be requested by the server 11 that receives the request to send an update and to which the device replies by communicating its own unique identification parameter. When the update is performed manually, the operator will ask the server (for example always the public server 11) to provide the updated software/firmware, also indicating the unique identification parameter of each device to be updated.

The request, forwarded to the internal server 49 located in the protected area 41, is managed by the internal server 49 as follows.

Firstly the encryption key (Key) combined with the unique identification parameter (ID) of the device 57 for which the update is intended is recovered from the database 45, while the updated software/firmware to be supplied to the device 57 can be recovered from the archive 47. The program generator 51 generates the encrypted program, using the recovered encryption key and associated only with the device 57 that has requested the update.

At this point the encrypted program can be transmitted or transferred to the device 57 in any way, also by means of a non-protected channel or via the personnel in charge of technical support, maintenance or updating. The file transferred is not decryptable, as it does not contain the encryption key. Only the device 57 can decrypt the software/firmware, as the encryption key is stored therein, the same key which the server 49 has recovered from the database 45 and via which the program generator 51 has encrypted the updating software/firmware. For this, the database 45 is used in which the respective encryption key is associated with each unique identification parameter of a device 57.

If the software or firmware is supplied to a device different from the one identified by the unique identification parameter (ID), said device is not able to decrypt it, since it does not possess the encryption key with which the software or firmware has been encrypted. The encrypted software or firmware intended for a specific device cannot be decrypted by any other device that does not possess the correct encryption key.

In this way the security of the transmission channel or of the carrier in general, which can also be an operator assigned to updating of the devices in the field, becomes irrelevant. When the carrier is an operator, he is not in possession of the encryption key and therefore cannot carry out reverse engineering of the software or firmware which he possesses and cannot install it on any device apart from the sole device authorized to receive the updated software or firmware, which is the only device that possesses the encryption key.

The process described can also be used during production of the devices, or during reconditioning or maintenance.

As appears clear from the description so far, the described process increases safety of the protection of information of the know-how owner company in various respects, preventing or in any case limiting the risk of fraudulent uses of the know-how, as summarized below.

If production is delegated to one or more subcontracting production sites, it often happens that the latter attempts to produce a greater number of devices than those actually ordered by the know-how owner company, for example to sell these extra devices on a parallel market. Normally the production site has all the information and materials necessary, comprising the bill of materials, the semi-finished products, the assembly plans and the software or firmware which often constitute the most important and valuable part of the technology to be protected. If the subcontracting production site has good contacts with the suppliers of the materials and semi-finished products, it is relatively easy to procure the latter in excess with respect to the production agreed with the company owning the know-how to be protected. The subcontracting production site is normally also in possession of the software in plain text which can be installed on any number of devices, thus creating an overproduction for parallel markets substantially without limits.

By adopting a system according to the invention, this is prevented. In fact, the production site can download via the connection channel with the know-how owner company only an encrypted software or firmware intended for a given device, characterized by a given encryption key which pertains only to that device.

It is assumed that a software expert, even in the absence of software in plain text, is able to clone the programmed microcontroller, i.e. is able to install the same software or firmware with the same encryption key in a further device different than the specific one for which the software is intended, identified by the unique identification parameter. Two identical devices will therefore be produced, with the same software and the same encryption key, and with the same unique identification parameter as well.

In the protected database 45, accessible only by the internal server 49, a record is stored that contains the unique identification parameter and the unique encryption key. The server 49 may also be able to store on the protected database 45, or on another protected archive, information concerning the updates downloaded by each device, thus having available at all times an updated situation of the status of each device in the field, including information on which software or firmware version is installed on each device identified by its own unique identification parameter. The system management software is designed so as to prevent the same device, i.e. a device with the same unique identification parameter, from being updated twice with the same software/firmware.

If two identical devices exist in the field, one original and the other cloned, when one of the two has performed the update, downloading the software/firmware from the know-how owner company website, the second device can no longer be updated. In fact, when the server 49 receives the second update request, the database of the server 49 will contain the information that the requesting device has already been updated and therefore a second update will be prevented. At the same time it will be possible to identify the device, if necessary know where it is installed and from which subcontracting production site it comes, thus identifying the source of the devices produced illegally.

Let's assume that for some reason microcontrollers are produced with regular unique coding (encryption key and unique identification parameter ID) and that these microcontrollers are in the hands of a subcontracting production site that wishes to create an overproduction. In this case unique devices can be produced (each with its own unique identification parameter and encryption key). However, in this case the data (ID and Key) of these excess devices are not present in the database 45 of the know-how owner company. Therefore, they cannot receive any application program or be updated, since the request for a software/firmware (whether it is a first application program or an update) will not be cleared, as the server 49 does not recognize the unique identification parameter as valid. The illegal device can be identified and located.

The situations described above allow identification of a device produced illegally when it connects up to the server 49 of the know-how owner company, or when this connection is established by a computer via which the software/firmware to be installed will be downloaded.

Let's now assume that whoever holds the illegally produced device is sufficiently cautious and never makes a connection to the server 49 of the know-how owner company. If the device necessarily has to be updated, the software/firmware must be obtained without passing through the server 49. In a traditional situation this is possible. In the case of a system according to the invention, vice versa, the update is virtually impossible. In fact, even if the holder of the illegally produced device were able to obtain an updated version of the software/firmware, this would be encrypted with an encryption key different from the one stored in the illegally produced device.

The described system and the procedures allow the following improvements to be obtained:

the firmware or software, which contains the most important part of the company's know-how, is protected against reverse engineering;

the software or firmware programmer is no longer one of the critical points of the security keys;

the subcontracting production site can be managed securely;

the know-how owner company can know exactly how many devices have been produced and are present on the market;

the know-how owner company can guarantee correct maintenance of the devices in the field;

the know-how owner company can verify if an illegally produced device exists in the field and locate it;

policies for firmware updating, and maintenance and warranty contracts can be managed.

It is understood that the drawing only shows an example provided solely as a practical demonstration of the invention, which can vary in its forms and arrangements without departing from the scope of the concept underlying the invention. The presence of reference numbers in the attached claims has the purpose of facilitating reading of the claim with reference to the description and the drawing, and does not limit the scope of the protection represented by the claims.

The invention claimed is:

1. A system for managing programmable electronic devices, comprising:
    a plurality of programmable electronic devices, each device identified by at least one unique identification parameter and containing at least one encryption key;
    at least one protected site comprising
        a protected electronic database, the database comprising stored data that includes the unique identification parameters and respective encryption keys for each of the plurality of electronic devices, such that each unique identification parameter for each electronic device is combined with the respective encryption key associated with the electronic device, and
        a software/firmware archive; and
    a server comprising program code and a processor effective to
        receive from one of the plurality of electronic devices a request for transmission of software stored in the software/firmware archive,
        retrieve from the protected database the encryption key associated with the unique identification parameter of the electronic device from which the request was received,
        retrieve the requested software from the archive,
        generate an encrypted version of the retrieved software, using the encryption key combined in the database with the unique identification parameter of the electronic device that has requested the transmission of the software, and
        send the encrypted software to the electronic device.

2. The system of claim 1, wherein the server further comprises program code effective to store software transmission information concerning the transmission of software to the electronic devices, and to subordinate the transmission of software requested by one of the devices to at least one condition defined by the stored software transmission information.

3. The system of claim 1, wherein the server further comprises program code effective to prevent a second transmission of software to a device to which the software has already been sent once.

4. The system of claim 1, further comprising at least one production site, the production site being different from the protected site, wherein the production site is functional to receive software from the server and program the electronic devices with the software.

5. The system of claim 4, the production site further comprising a program generator.

6. The system of claim 1, wherein the protected site further comprises a program generator effective to generate software associated with a unique identification parameter of one of the electronic devices and with an encryption key corresponding to the unique identification parameter.

7. The system of claim 1, wherein the server further comprises program code effective to:
    receive a request for software by one of the electronic devices, the request comprising at least the unique identification parameter of the requesting device;
    verify whether the unique identification parameter of the device that requested the software is stored in the protected database;
    if the unique identification parameter of the requesting device is stored in the protected database, verify at least one update enabling condition by the requesting device; and
    if the update enabling condition is verified as met, send to the requesting device a version of the requested software encrypted with the encryption key associated with the unique identification parameter of the requesting device.

8. The system of claim 1, wherein the server further comprises program code effective to supply a bootloader to each of the devices.

9. The system of claim 8, wherein the server further comprises program code effective to supply to each of the devices a bootloader associated with an encryption key.

10. The system of claim 8, wherein the server further comprises program code effective to supply to each of the devices a bootloader associated with a unique identification parameter of the devices.

11. The system of claim 8, wherein the server further comprises program code effective to supply to each of the devices the bootloader in an encrypted version.

12. A method for installing software on a plurality of electronic device, comprising the steps of:
    storing in each electronic device at least one unique identification parameter and at least one encryption key;
    in a protected database provided in a protected site, storing for each device the respective unique identification parameter and the respective encryption key in a combined manner, such that each unique identification parameter of each the electronic devices is combined with the respective encryption key associated with the respective electronic device;
    providing a software/firmware archive in the protected site;
    providing a server in the protected site;
    receiving at the server a request for software from one of the electronic devices;
    retrieving from the protected database the encryption key associated with the unique identification parameter for the device from which the request was received;
    retrieving the requested software from the archive;
    encrypting the retrieved software to be installed on the electronic device requesting the software, with the encryption key corresponding to the unique identification parameter of the electronic device requesting the software;
    transferring the encrypted software to the electronic device requesting the software; and installing the software in the electronic device requesting the software.

13. The method of claim 12, further comprising the steps of:
- generating a request for software by one of the devices, the request comprising at least the unique identification parameter of the requesting device;
- verifying whether the unique identification parameter for the device that has requested the software is stored in the protected database;
- if the unique identification parameter of the requesting device is stored in the protected database, verifying if the requesting device meets at least one update enable condition;
- if the update enable condition is met, sending to the requesting device a version of the software requested, encrypted with the encryption key combined with the unique identification parameter of the requesting device and recovered from the protected database;
- if the update enable condition is not met, not sending the software requested to the requesting device.

14. The method of claim 12, further comprising the steps of
- verifying whether, for the unique identification parameter for the requesting device, the software to be installed has already been transferred;
- if the software to be installed has not been transferred, transferring the software to the requesting device; and
- if the software to be installed has been transferred, performing at least one of
  - denying transfer of the software to the device, and
  - generating a signal.

\* \* \* \* \*